Figure 1:
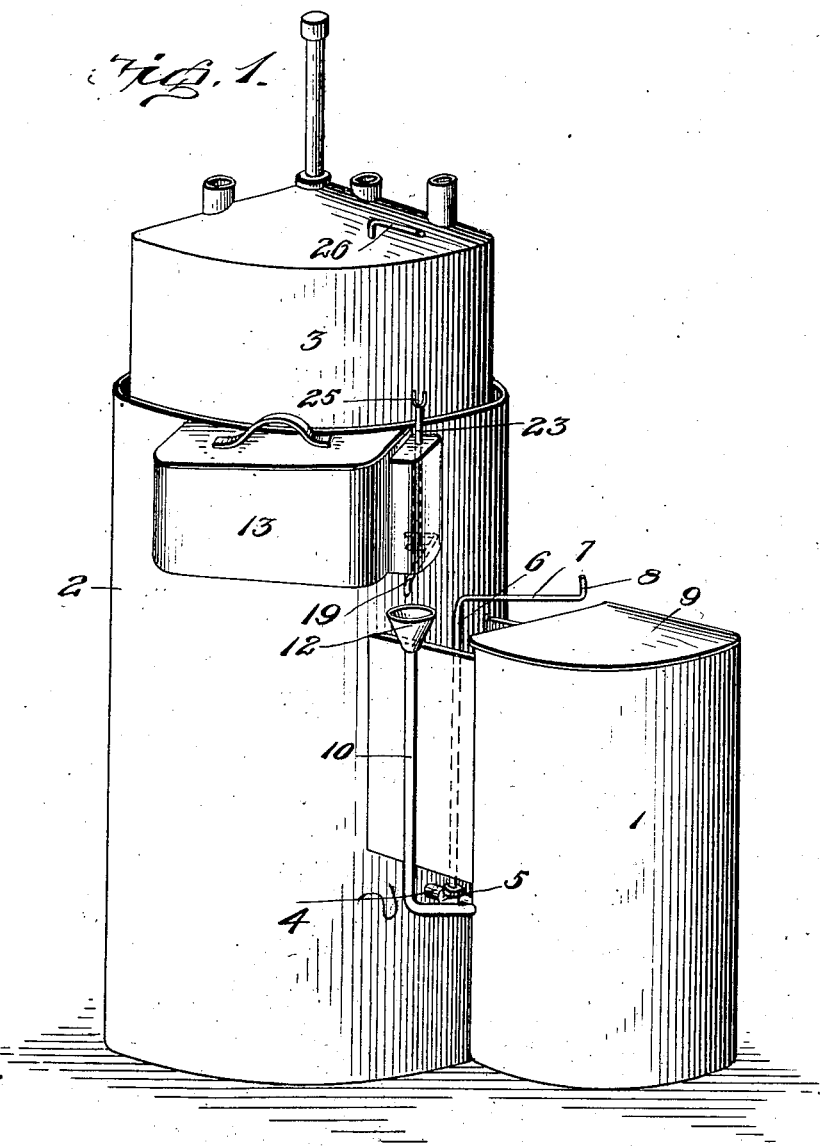

No. 648,812. Patented May 1, 1900.
C. M. STROUD & A. G. PHELPS.
ACETYLENE GAS GENERATOR.
(Application filed Oct. 18, 1899.)

(No Model.) 2 Sheets—Sheet 1.

No. 648,812. Patented May 1, 1900.
C. M. STROUD & A. G. PHELPS.
ACETYLENE GAS GENERATOR.
(Application filed Oct. 18, 1899.)
(No Model.) 2 Sheets—Sheet 2.

Inventors
C. M. Stroud
A. G. Phelps

Witnesses

UNITED STATES PATENT OFFICE.

CHARLES M. STROUD AND ALVAH G. PHELPS, OF HASTINGS, MINNESOTA.

ACETYLENE-GAS GENERATOR.

SPECIFICATION forming part of Letters Patent No. 648,812, dated May 1, 1900.

Application filed October 18, 1899. Serial No. 733,952. (No model.)

*To all whom it may concern:*

Be it known that we, CHARLES M. STROUD and ALVAH G. PHELPS, citizens of the United States, residing at Hastings, in the county of Dakota and State of Minnesota, have invented certain new and useful Improvements in Automatic Acetylene-Gas Generators; and we do declare the following to be a full, clear, and exact description of the invention, such as will enable others skilled in the art to which it appertains to make and use the same.

Our invention relates to improvements in automatic acetylene-gas generators, and more particularly to the means for automatically supplying the feed-water to the carbid in the generator-chamber; and the object is to simplify and improve the construction and provide a positive supply of water to the carbid, so that the generation of the gas will be directly and positively controlled by the amount of gas consumed, so that the generation will be in direct proportion to the consumption.

To this end the invention consists in the construction, combination, and arrangement of the several elements of the apparatus, as will be hereinafter more fully described, and particularly pointed out in the claim.

In the accompanying drawings the same reference characters indicate the same parts of the machine.

Figure 2:
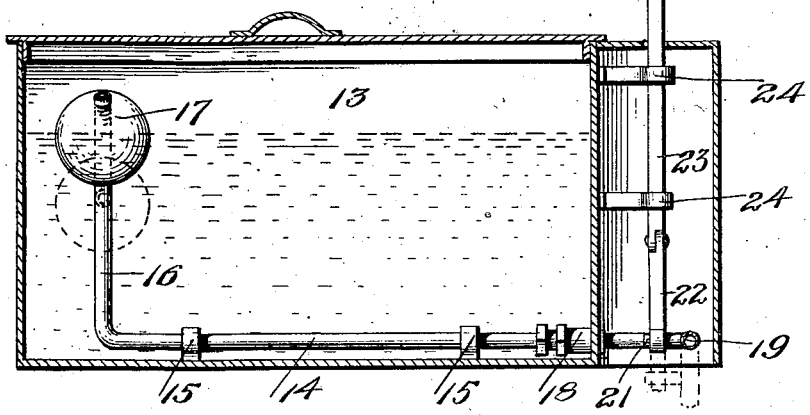
Figure 3:
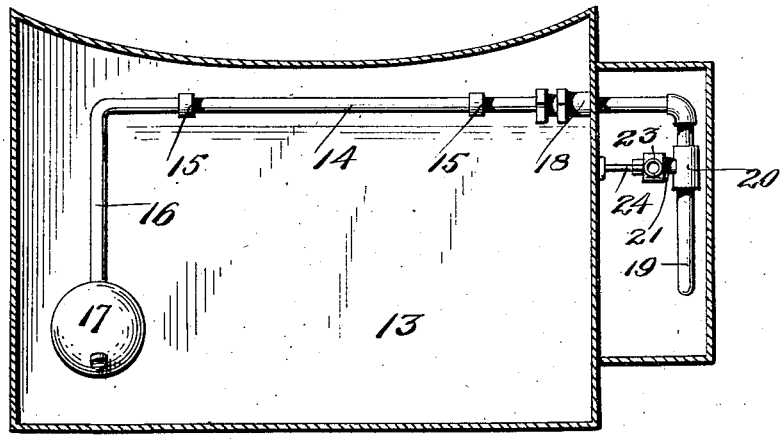

Figure 1 is a perspective view of our improved automatic acetylene-gas generator. Fig. 2 is a vertical section. Fig. 3 is a horizontal section through the feed-water tank.

1 denotes the generator-tank or carbid-chamber, 2 the gas-holder tank, and 3 the gas holder or bell.

4 denotes the gas-pipe leading from the carbid-chamber to the gas-holder, and it is provided with a plug-cock 5, the stem 6 of which is formed with a horizontal arm 7, terminating in a handle 8, which extends across the top 9 of the carbid-chamber 1, so arranged that when it becomes necessary to recharge the carbid-chamber the arm 7 must be turned to one side and close the cock 5, thus shutting off all communication between the generator and the holder before the cover 9 can be removed from the generator.

10 denotes the water-supply pipe for the generator, which terminates in a funnel 12. 13 denotes the water-supply tank, which is supported by the tank 2, and in it is horizontally mounted a tubular shaft 14 in suitable brackets 15 15. The inner end of this tubular shaft terminates in a lateral pipe 16, the end of which is open and extends through a float 17, secured thereon. The opposite end of said tubular shaft extends through a packing-box 18 and terminates in a lateral gooseneck or nozzle 19, which opens immediately above the feed-water funnel 12. A bracket 20 is fixed to the nozzle 19, and it is provided with a wrist-pin 21, which is encompassed by the lower end of a rod 22, the upper end of which is pivoted to the lower end of a vertical bar 23, having a vertical sliding engagement with the guide-brackets 24 24, alined on the outside of the feed-water tank. The upper end of this bar 23 terminates in a stirrup 25, which projects into the path of a horizontal arm 26, fixed to the top of the gas-holder 3. The construction and arrangement are such that when not interfered with the float 17 rests upon the surface of the water in the tank 13, so that the open end of the pipe 16 is above the water-level. If, however, the gas-bell lowers (due to the consumption of gas) and the arm 26 depresses the rods 22 23, gooseneck 19, and tube 16, the float 17 will also be carried down and the open end of the tube 16 submerged, so that the water in the tank 13 will flow through the tubes 16, 14, and 19 into the funnel 12, whence it passes through the pipe 10 and is discharged upon the carbid, causing a generation of gas in the generator-chamber, and this fresh supply of gas passing through the pipe 4 into the tank 2 causes the gas-holder 3 to rise. The upward movement of the holder carries with it the arm 26, which releases the bars 23 22, and the buoyancy of the float raises the open end of the tube 16 above the water-level in the feed-water tank. Consequently the supply of water to the carbid is cut off and the generation of the gas is stopped until the holder again falls, with a like result as in the first instance.

It will of course be understood that various changes in the form, proportion, and the minor details of construction may be resorted to without departing from the principle or sacrificing any of the advantages of this invention.

Having thus fully described our invention, what we claim as new and useful, and desire to secure by Letters Patent of the United States, is—

In an acetylene-gas apparatus, the combination with the generator and the holder communicating therewith, a feed-water-inlet pipe for the generator, and a feed-water tank mounted above the generator, of a discharge-pipe mounted in the feed-water tank and having its outlet end arranged vertically above the mouth of the feed-water-inlet pipe for the generator, a float carried by the inlet end of the discharge-pipe, a bracket or arm carried by the gas-holder and projecting into the path of the outlet end of said discharge-pipe, substantially as and for the purpose set forth.

In testimony whereof we have hereunto set our hands in presence of two subscribing witnesses.

CHARLES M. STROUD.
ALVAH G. PHELPS.

Witnesses:
CORA M. MAHAR,
C. STANLEY LOWELL.